United States Patent Office 3,219,620
Patented Nov. 23, 1965

3,219,620
RUBBER COMPOSITION AND PREPARATION
James Van Dyck Fear, Media, Pa., assignor to Sun Oil Company, Philadelphia, Pa., a corporation of New Jersey
No Drawing. Filed July 18, 1961, Ser. No. 124,793
2 Claims. (Cl. 260—33.6)

This application is a continuation-in-part of application Serial No. 718,475, filed March 3, 1958, and now abandoned.

This invention relates to rubber compositions comprising a hydrocarbon oil obtained in a particular manner from petroleum and to methods for preparing such compositions.

Various hydrocarbon oils derived from petroleum have been used in the prior art as rubber processing oils. For the most part, such oils have comprised either straight run lubricating oils having aromatic contents (i.e. contents of compounds containing one or more aromatic rings in the molecule) for example within the approximate range from 20 to 45 weight percent, or extracts obtained from such straight run oils by solvent extraction and having aromatic content for example above 50 weight percent. The straight run oils are relatively low in content of aromatic and naphthenic (i.e. cycloaliphatic) rings, whereas the extracts obtained from such oils are relatively high in the content of such rings.

Generally speaking, it is advantageous for a rubber processing oil to have a relatively high combined content of aromatic and naphthenic rings, since this results in advantageous properties with respect to processability of the oil with rubber compositions. However, it is generally not advantageous for the ratio of aromatic to naphthenic rings in the oil to be high, since the aromatic rings when present in excessive quantities tend to produce deleterious results in the rubber composition with respect to heat buildup, low temperature properties, etc. A particularly advantageous composition would be a material highly concentrated with respect to those polycyclic compounds which contain both aromatic and naphthenic ring structure, e.g. a dicyclic compound containing one aromatic and one naphthenic ring, a tricyclic compound containing one aromatic and two naphthenic rings, a tetracyclic compound containing two aromatic rings and two naphthenic rings, etc. Such compositions are not obtained, however, in ordinary procedures for producing rubber processing oils. They are not produced in ordinary solvent extraction of straight run petroleum oils, for example. The solubility of the aromatic-naphthenic polycyclic compounds in the ordinary selective solvents is not sufficiently great for them to be obtained in a highly pure state with respect to freedom from contamination by nonaromatic compounds, i.e. compounds containing no aromatic ring in the molecule.

The present invention however provides a rubber processing oil which has an advantageously high content of polycyclic compounds containing both aromatic and naphthenic ring structure in the molecule. The content of nonaromatic compounds and the content of cyclic compounds which do not contain naphthenic ring structure are advantageously low in this rubber processing oil.

The charge stock for the preparation of the rubber processing oil is a cracked gas oil produced along with cracked gasoline by thermal or catalytic cracking of petroleum materials heavier than gasoline. The term, cracked gas oil, is used herein to designate all, or any fraction of, those cracked products heavier than gasoline. These cracking processes are well known in the art, and any of the known processes can be employed to produce the charge stock from which the rubber processing oil is made.

This charge stock has a high content of polycyclic compounds containing only aromatic ring structure. As a result of dealkylation and dehydrogenation reactions which occur in the cracking process, the aromatic components of the cracked products contain very substantially less acyclic and cycloaliphatic structure than the oil prior to cracking. Consequently, they are much more susceptible to extraction from the cracked products in a form relatively uncontaminated by nonaromatic compounds than are the aromatic components of the oil prior to cracking.

In a preferred embodiment, the rubber processing oil is prepared by solvent extraction of the cracked fraction to produce an extract which has a high content of polycyclic aromatic compounds, followed by hydrogenation of the extract under conditions to provide partial hydrogenation of the aromatic compounds in the extract. This combination of operations provides a rubber processing oil which has highly advantageous contents of compounds containing both aromatic and naphthenic rings.

As compared with the original cracked fraction, the hydrogenated aromatic concentrate has a higher total aromatic content and a higher content of compounds containing both aromatic and naphthenic rings. The high aromatic content is beneficial in providing good processibility with rubber and is obtained while avoiding the disadvantages of the excessively aromatic nature of the oil which is caused by the presence of excessive amounts of compounds containing mostly or all aromatic rings.

In place of solvent extraction as a means of preparing an aromatic concentrate, a selective adsorbent such as silica gel can be used. The essential feature is that an aromatic concentrate be obtained by separation of aromatic compounds from nonaromatic compounds, and any of the known means for providing this result can be employed.

Where a selective solvent for aromatic compounds is employed, any of the known solvents for this use can be used, e.g. furfural, liquid sulfur dioxide, phenol, dichloroethyl ether, etc. Where a selective adsorbent is employed, any of the known adsorbents for selectively removing aromatic hydrocarbons from mixtures can be employed, and if desired any of the known liquid desorbents for removing adsorbed hydrocarbons from the adsorbent can also be employed.

The hydrogenation conditions which are employed to prepare the rubber processing oil according to the invention are adapted to bring about a partial hydrogenation of aromatic compounds, and particularly to convert polycyclic aromatic compounds into monocyclic aromatic compounds or into other compounds containing a lesser number of aromatic rings. The temperature employed in the hydrogenation is within the approximate range from 450 to 750° F., preferably 600 to 700° F. The pressure employed is within the approximate range from 100 to 3000 p.s.i.g. and preferably at least 1000 p.s.i.g. The liquid hourly space velocity is preferably within the approximate range from 0.5 to 5 volumes of charge per volume of catalyst bed per hour.

Any of the known hydrogenation catalysts can be employed, for example cobalt, molybdenum, platinum, nickel, iron, palladium, chromium, oxides or sulfides of such metals, etc. Any of the known carriers for hydrogenation catalysts, such as silica, alumina, bauxite, fuller's earth, etc. can be employed. Coprecipitated or impregnated catalyst can be used.

The preparation of the rubber processing oil according to the invention is further advantageous in that the hydrogenation generally produces not only a beneficial conversion of aromatic rings to naphthene rings, but also beneficial reactions which improve the color, color stability and nonstaining properties of the oil. The low temperature properties of the oil, such as pour point, are also beneficially affected, in some instances at least, by hydrogenation of aromatic rings.

The following example illustrates the invention:

A catalytically cracked gas oil obtained in a conventional cracking process employing synthetic silica-alumina cracking catalyst is employed as the charge stock. This cracked gas oil has A.P.I. gravity of about 24, Saybolt Universal viscosity at 100° F. of about 64 and at 210° F. of about 32. The initial boiling point is about 497° F., the 10% point about 641° F., and 50% point about 702° F., the 90% point about 814° F. and the endpoint (98%) about 906° F. The cracked gas oil has refractive index of 1.5233 and contains about 40 weight percent aromatic compounds of which about 5% are monocyclic aromatics, 30% dicyclic aromatics and 5% tricyclic aromatics based on total cracked gas oil.

The cracked gas oil is furfural extracted at 125° F. using 55 volumes of furfural per 100 volumes of cracked gas oil. A raffinate comprising about 70% of the cracked gas oil and an extract comprising about 30% of the cracked gas oil are obtained. The extract has A.P.I. gravity of about 2, pour point about 10° F., Saybolt Universal viscosity at 100° F. of about 215 and at 210° F. of about 40. The initial boiling point is about 541° F., the 10% point about 611° F., the 50% point about 713° F., the 90% point about 860° F. and endpoint (97%) about 932° F. The refractive index is 1.6390 and the aromatic content is about 89.4%.

This extract is hydogenated at 685° F. and 1500 p.s.i.g. at a space rate of one. The hydrogen consumption is about 1500 standard cubic feet per barrel. The hydrogenated product contains about 80% of aromatic compounds, the bulk of which are polycyclic compounds containing naphthene as well as aromatic rings in the molecule, the content of such compounds being much greater than in the charge stock.

The hydrogenated extract is employed as a rubber processing oil in the preparation of the following rubber composition; which is cured at 392° F. for 15 minutes:

| Component: | Parts by weight |
| --- | --- |
| Butadiene-styrene inter polymer ("GR-S Polysar XPRD-211") having Mooney viscosity (ML-4) above 110 | 100 |
| Zinc oxide ("Kadox-15") | 3 |
| N - cyclohexyl - 2 - benzothiazyl sulfonamide ("Santocure") | 1.25 |
| Carbon black ("Philblack-O") | 65 |
| Stearic acid | 2 |
| Sulfur | 2 |
| Hydrogenated extract | 45 |

The processability of the hydrogenated extract with the rubber composition is particularly good as a result of the relatively high content of aromatic and naphthenic rings in the oil. On the other hand, the heat buildup and low temperature properties of the compounded rubber are superior to those which would be obtained with the unhydrogenated extract, since the relatively low ratio of aromatic to naphthenic rings in the hydrogenated extract as compared with the unhydrogenated extract is beneficial with respect to these properties. The non-staining properties of the rubber processing oil are also superior as compared with the unhydrogenated extract.

It is essential that the extraction precede the hydrogenation. The polycyclic aromatics which contain no naphthenic rings, or a relatively high ratio of aromatic to naphthene rings, can be recovered in high purity by solvent extraction from fractions containing saturated compounds, whereas partially hydrogenated polycyclic compounds, containing relatively lower ratio of aromatic to naphthene rings, are difficult to recover in high purity by solvent extraction. Therefore by extracting highly aromatic polycyclic compounds and hydrogenating the extract, partially hydrogenated polycyclic compounds can be obtained in high concentration, whereas hydrogenation prior to extraction would convert the polycyclic aromatics into partially hydrogenated compounds which could not be extracted easily in high purity from the hydrogenated oil. Since the partially hydrogenated polycyclic compounds containing a relatively low ratio of aromatic to naphthene rings per molecule are the desired compounds for the rubber processing oil according to the invention, and it is desired to obtain them in as high purity as possible, it is essential that the charge stock have a relatively high content of highly aromatic polycyclic compounds, and that the extraction precede the hydrogenation.

The rubber processing oil according to the invention is useful generally in plasticizing and extending those rubber compositions, well known in the art, which are adapted to plasticizing and extending by petroleum fractions. Such compositions include natural rubber and synthetic rubber obtained by polymerization of butadiene compounds either alone or together with vinyl monomers such as styrene, acrylonitrile and other materials as known in the art. The processing oil can be used as a plasticizer for ordinary synthetic rubber polymers or as an extender for high Mooney viscosity synthetic rubber polymers. In ordinary polymer compositions, generally the amount of oil used will be within the approximate range from 5 to 50 parts by weight of oil per 100 parts of polymer. In the extended polymer compositions where the Mooney (ML-4) viscosity of the polymer or extender is 80 to 240, the amount of oil used is generally in the approximate range from 10 to 20 parts of oil per 100 parts of polymer, more preferably within the range from 20 to 80 parts of oil per 100 parts of polymer.

The rubber processing oil according to the invention can be incorporated in the rubber composition by any suitable known method such as admixture with latex prior to coagulation, mixing with coagulated rubber in milling operations, etc. Other known rubber compounding ingredients may be present such as fillers, vulcanizing agents, vulcanizing accelerators, etc. The rubber compositions may be cured according to known procedures to provide cured rubber compositions suitable in various uses, such as automobile tires, rubber footwear, etc.

Usually the hydrogenated aromatic concentrate used as a rubber processing oil according to the invention has an aromatic content of at least 60 weight percent, and preferably at least 75 weight percent. The concentrate prior to hydrogenation preferably has aromatic content of at least 80 weight percent.

The normally liquid polycyclic aromatic concentrate which is hydrogenated according to the invention usually has an average ratio of aromatic to naphthene rings in the aromatic molecules thereof, i.e. in the aromatic portion of the concentrate, of at least 2. Concentrates having higher such ratios are generally suitable, up to concentrates in which the rings are substantially all aromatic and naphthenic rings are substantially absent. Frequently such ratio is in the range from 3 to 30. The hydrogenated product, on the other hand, typically has such ratio in the range from 0.25 to 5, preferably 1 to 2. The extent of decrease in such ratio is typically at least 0.5 unit, e.g. from a ratio of 3 to a ratio of 2.5; frequently, the extent of decrease does not exceed 25 units, though greater extents of decrease are obtained in some cases.

The invention claimed is:

1. A composition of matter comprising a rubber selected from the group consisting of natural rubber, synthetic homopolymers of conjugated dienes and synthetic copolymers of conjugated dienes and ethylenically unsaturated monomers, and a rubber processing oil comprising a product obtained by hydrogenating a normally liquid polycyclic aromatic concentrate from a cracked petroleum gas oil containing 80 to 100 weight percent of aromatic hydrocarbons and having an average ratio of aromatic to naphthene rings in the aromatic molecules thereof in the range from 2 to 30, at a temperature in the range from 450 to 750° F. and at a pressure in the range from 100 to 3000 p.s.i.g. to obtain a hydrogenated product containing 60 to 100 weight percent of aromatic hydrocarbons and having an average ratio of aromatic to naphthene rings in the aromatic molecules thereof in the range from 0.25 to 5 and 0.25 to 25 units less than the corresponding ratio in said concentrate.

2. Method of preparing rubber compositions which comprises admixing a rubber selected from the group consisting of natural rubber, synthetic homopolymers of conjugated dienes and synthetic copolymers of conjugated dienes and ethylenically unsaturated monomers, with a product obtained by hydrogenating a normally liquid polycyclic aromatic concentrate from a cracked petroleum gas oil containing 80 to 100 weight percent of aromatic hydrocarbons and having an average ratio of aromatic to naphthene rings in the aromatic molecules thereof in the range from 2 to 30, at a temperature in the range from 450 to 750° F. and at a pressure in the range from 100 to 3000 p.s.i.g. to obtain a hydrogenated product containing 60 to 100 weight percent of aromatic hydrocarbons and having an average ratio of aromatic to naphthene rings in the aromatic molecules thereof in the range from 0.25 to 5 and 0.25 to 25 units less than the corresponding ratio in said concentrate.

References Cited by the Examiner

UNITED STATES PATENTS

| | | | |
|---|---|---|---|
| 2,334,582 | 11/1943 | Read | 260—33.6 |
| 2,415,541 | 2/1947 | Soday | 260—33.6 |
| 2,698,280 | 12/1954 | Hersberger et al. | 260—33.6 |
| 2,778,807 | 1/1957 | Boggs | 260—33.6 |
| 2,778,808 | 1/1957 | Dunkel et al. | 260—33.6 |
| 2,799,627 | 7/1957 | Haensel | 208—144 |
| 2,915,452 | 12/1959 | Fear | 208—144 |
| 2,925,398 | 2/1960 | Coran et al. | 260—33.6 |
| 2,945,803 | 7/1960 | Beuther et al. | 208—144 |
| 2,945,833 | 7/1960 | Hoel | 260—33.6 |
| 2,964,083 | 12/1960 | Pfau et al. | 260—32.4 |

OTHER REFERENCES

Roestler et al.: "Industrial & Engineering Chemistry," March 1949, pp. 598–608, vol. 41, No. 3.

Weinstock et al.: "Industrial and Engineering Chemistry," vol. 45, No. 5, May 1953, pp. 1035–1043.

MORRIS LIEBMAN, *Primary Examiner.*

LEON J. BERCOVITZ, ALEXANDER H. BRODMERKEL, *Examiners.*